(12) United States Patent
Hollister

(10) Patent No.: US 7,486,965 B1
(45) Date of Patent: Feb. 3, 2009

(54) INTEGRATED NETWORK SYSTEM

(75) Inventor: Allen Hollister, Soquel, CA (US)

(73) Assignee: Plantronics, Inc., Santa Cruz, CA (US)

( * ) Notice: Subject to any disclaimer, the term of this patent is extended or adjusted under 35 U.S.C. 154(b) by 813 days.

(21) Appl. No.: 10/746,571

(22) Filed: Dec. 23, 2003

(51) Int. Cl.
*H04M 1/00* (2006.01)

(52) U.S. Cl. .............. 455/553.1; 455/552.1; 455/575.2; 455/575.1; 455/569.1; 455/557

(58) Field of Classification Search ................. 455/426, 455/462, 349, 557, 555
See application file for complete search history.

(56) References Cited

U.S. PATENT DOCUMENTS

| | | | |
|---|---|---|---|
| 5,913,163 A * | 6/1999 | Johansson ................ | 455/426.1 |
| 6,349,212 B1 * | 2/2002 | Martensson et al. ......... | 455/462 |
| 2001/0030950 A1 | 10/2001 | Chen et al. | |
| 2003/0134661 A1 | 7/2003 | Rudd et al. | |
| 2003/0169752 A1 | 9/2003 | Chen et al. | |
| 2003/0181213 A1 | 9/2003 | Sugar et al. | |
| 2004/0047310 A1 | 3/2004 | Chen et al. | |
| 2004/0047358 A1 | 3/2004 | Chen et al. | |
| 2005/0058091 A1 | 3/2005 | Rudd et al. | |

FOREIGN PATENT DOCUMENTS

| | | |
|---|---|---|
| EP | 1330076 A1 | 7/2003 |
| WO | WO0156233 A1 * | 8/2001 |
| WO | WO03061230 A1 | 7/2003 |
| WO | WO03077442 A1 | 9/2003 |
| WO | WO03081848 A1 | 10/2003 |

* cited by examiner

*Primary Examiner*—Charles N Appiah
*Assistant Examiner*—Randy Peaches
(74) *Attorney, Agent, or Firm*—Intellectual Property Law Office of Thomas C. Chuang

(57) ABSTRACT

The present invention provides an inventive integrated network system. The system includes a keypad, microphone, loudspeaker, and a wired network interface for connecting to a wired network to receive and transmit data. The integrated network device also includes a wireless protocol interface for receiving, transmitting, and processing data. The integrated network device further includes a wireless protocol interface for receiving, transmitting, and processing voice communications.

8 Claims, 4 Drawing Sheets

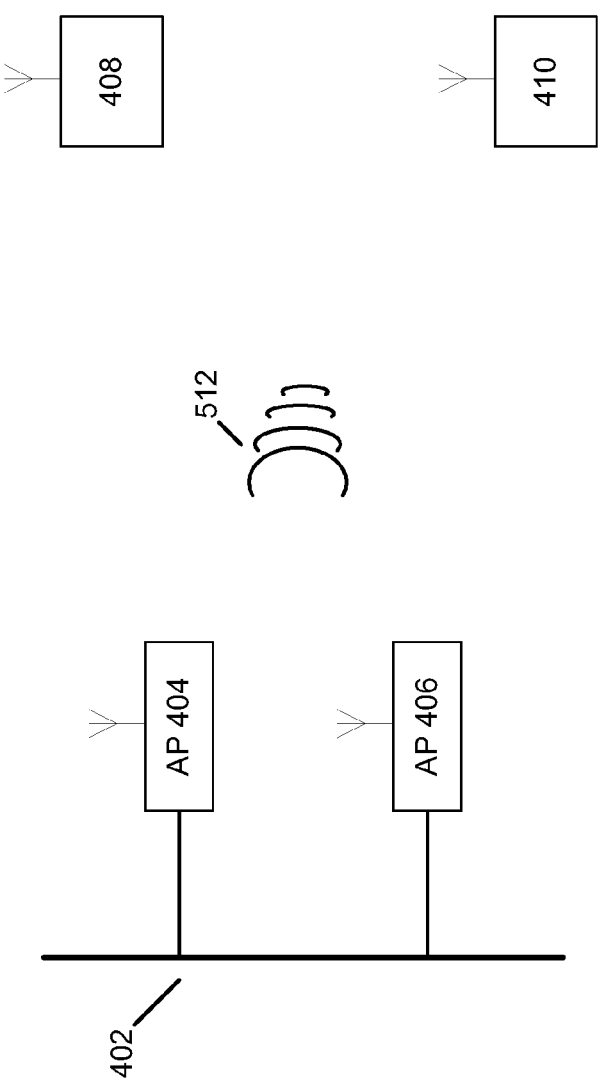

INTEGRATED NETWORK SYSTEM

TECHNICAL FIELD

The present invention relates to the general field of telecommunications and wireless networks. More specifically the invention relates to integrated network systems.

BACKGROUND

Wireless data networks and telephone networks have generally remained separate and utilized different hardware and software systems. The digital enhanced cordless telecommunications (DECT) standard is a wireless air interface and communication protocol designed to provide wireless communications for telecommunications equipment such as cordless phones. The DECT standard is promulgated by the European Telecommunications Standards Institute. It operates in the 1.8 GHz radio band, employing Time Division Multiple Access (TDMA) technology. DECT operates at speeds of 2 Mbps and is ideal for use in voice applications. DECT offers the advantages of low power consumption, enabling smaller batteries to be used in a wireless headset.

The use of Wireless Local Area Networks (WLANs) has recently increased. In particular, the IEEE 802.11 (also referred to herein as simply "802.11") series of WLAN specifications have gained widespread acceptance. IEEE 802.11 wireless LAN's are becoming pervasive throughout the industry.

The IEEE 802.11 WLAN standard addresses the basic transport of LAN data over a wireless medium. There are currently three variations of 802.11: IEEE 802.11a (5 GHz, 54 Mbps), IEEE 802.11b (2.4 GHz, 11 Mbps), and IEEE 802.11g (2.4 GHz, 22 Mbps).

Referring to FIG. 4, a prior art 802.11 LAN is illustrated. A distribution system 402, also referred to as a backbone, is used to forward frames to their destination when several access points are connected to form a large coverage area, requiring communication between each access point to track the movements of mobile stations. In many embodiments Ethernet is utilized. Access points 404, 406 act as bridges between the wireless world and the wired world. Each access point has at least two network interfaces: a wireless interface that understands 802.11 and a second interface with wired networks. Typically, the wired interface is an Ethernet port and/or WAN port. Access points typically have a TCP/IP interface. Stations 408, 410 are computing devices with wireless network interfaces, typically laptops or handheld computers. Stations 408, 410, can also be computers not intended to be portable, such as desktops. Wireless medium 412 is utilized to move frames from stations 408, 410 to access point 404, 406 with radio frequency layers being used in typical embodiments.

In the prior art, separate devices are utilized for telephone and data applications. For example, most solutions utilize separate 802.11 access points, telephones, network interfaces, and headsets. However, convergence of telephone networks and data networks in the office environment, and VoIP as emerged as an alternative to traditional POTS networks. As a result, improved networks with both wireless data and telephone functionality are needed.

SUMMARY OF THE INVENTION

The present invention provides a solution to the needs described above through an inventive integrated network system.

The present invention provides for an integrated network device. The integrated network device includes a keypad, microphone, loudspeaker, and a wired network interface for connecting to a wired network to receive and transmit data. The integrated network device also includes a wireless protocol interface for receiving, transmitting, and processing data. The integrated network device further includes a wireless protocol interface for receiving, transmitting, and processing voice communications.

The invention further provides for a wireless headset system. The wireless headset system includes a headset and a wired integrated network device. The headset includes a speaker, a microphone, and either a first or second transceiver. The first transceiver utilizes the IEEE 802.11 wireless protocol and the second transceiver utilizes the DECT protocol. The wired integrated network device includes a network interface for connecting to a WAN to receive and transmit data over the WAN, and an IEEE 802.11 interface for receiving, transmitting, and processing data using IEEE802.11, and a DECT interface for receiving, transmitting, and processing voice communications using DECT.

The invention provides for a wireless communications network. The network includes a wireless headset with a DECT transceiver and IEEE 802.11 transceiver. The network further includes wired integrated network devices. Each wired integrated network device includes a network interface for connecting to a WAN, a DECT transceiver, and an IEEE 802.11 wireless protocol interface for receiving data from, data processing, and transmitting data to the headset transceiver. Each wired integrated network device serves as an IEEE 802.11 access point with an associated coverage area, and a roaming wireless headset communicates with a selected wired integrated network device depending on the roaming wireless headset location.

The invention further provides for an integrated telephone and data system. The system includes a wireless headset utilizing a DECT transceiver, a portable computer for initiating telephone dialing, and a network interface device. The network interface device includes a network interface for connecting to a WAN to receive and transmit data over the WAN, an IEEE 802.11 transceiver for receiving telephone dialing information from the computer, and a DECT transceiver for transmitting and receiving voice data to and from the wireless headset.

DESCRIPTION OF THE DRAWINGS

The features and advantages of the apparatus and method of the present invention will be apparent from the following description in which:

FIG. 4 is a diagram illustrating the components of a prior art 802.11 system.

DETAILED DESCRIPTION OF THE PREFERRED EMBODIMENTS

The present invention provides a solution to the needs described above through an inventive integrated network system. Other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
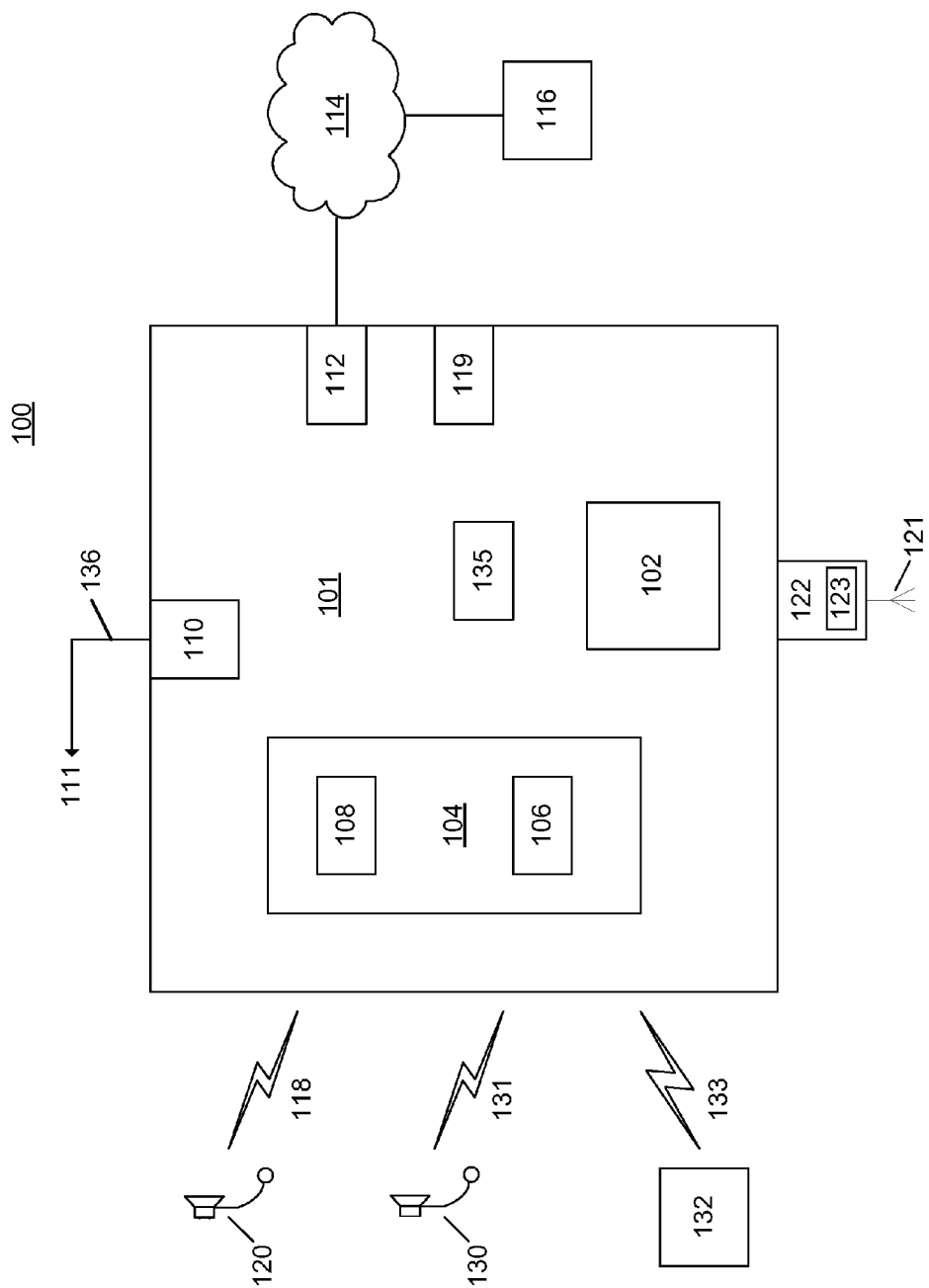
FIG. 1 is an illustration of an embodiment of an integrated network system.

The present disclosure describes an integrated system that is operational with both telephone and data networks, and offers wireless functionality. Referring to FIG. 1, an illustration of an embodiment of an integrated network system is shown. The voice and data communications network 100 includes an integrated network device 101 for communicating with a wireless headset 120. The integrated network device 101 includes a numeric keypad 102, handset 104, wired interface 112, IEEE 802.11 wireless protocol transceiver 122, and DECT transceiver 119. Handset 104 includes microphone 106 and speaker 108. In an embodiment of the invention, wired interface 112 is an Ethernet port. Wired interface 112 may also be a WAN port. Integrated network device 101 may further include a POTS interface 110 coupled to POTS network 111 via wired line 136. Integrated network device 101 is a multi-functional communications device, with functionality of an 802.11 access point (AP) and telephone. The integrated network device 101 of the present invention may be constructed using discrete components, such as PCM-CIA cards and digital signal processing (DSP) chips (and associated filters, A/D and D/A converters, power supplies, etc.). For simplicity of explanation, only a subset of elements is shown.

DECT transceiver 119 transmits and receives voice communications with a headset 120 via DECT link 118. IEEE 802.11 wireless protocol transceiver 122 transmits and receives data with a headset 130 or computer 132 via IEEE 802.11 wireless link 131 and 133 respectively. Wired interface 112 is coupled to a wired network 114 via wired line 138, which may have one or more computers 116 networked. Integrated network device 101 functions as an AP for a PC 132 performing computing functions connected to a wired network 114.

Integrated network device 101 includes an IEEE 802.11 wireless protocol transceiver 122. Transceiver 122 includes an antenna 121 coupled to an 802.11 RF transmitter and an 802.11 RF receiver. The transmitter components of a direct sequence network include a physical-layer convergence procedure (PLCP), spreader, transmit mask filter, and DBPSK/DQPSK modulator. The receiver components include a correlator, DBPSK/DQPSK demodulator, descrambler, and PCLP. 802.11 RF transmitter 216 and 802.11 RF receiver 218 are coupled to an 802.11 digital signal processor 123.

802.11 chipmakers include Intersil, Agere (Lucent), and Texas Instruments. Digital signal processor 123 is capable of being programmed to handle multiple radio technologies and standards, and is a field programmable gate array (FPGA) digital signal processor in one embodiment of the invention. Manufacturers of 802.11 interface cards include Nokia and Symbol. Integrated network device 101 includes functionality of an AP, such as those manufactured by Orinco (e.g., AP 1000 Access Point) and Nokia (e.g., A032 Access Point). Integrated network device 101 provides services including authentication, distribution, Medium Access Control service data unit (MSDU) delivery, and privacy services. In an embodiment of the invention, antenna 121 is an omni-directional antenna in order to cover a large area. In an alternative embodiment, a directional antenna may be used to increase transmission distance, concentrate the signal in a given area, and limit the quantity of signal escaping from a desired area.

Wireless headset 120 includes a DECT transmitter and DECT receiver (the combination referred to as a DECT transceiver) for transmission and reception of audio or data over a DECT link. Wireless headset 120 contains a microphone input for receiving a voice input and an audio speaker for outputting a voice output. In a further embodiment wireless headset 120 may utilize a Bluetooth transceiver.

In operation, the speech of a user of a wireless headset 120 is converted to DECT packets and transmitted by a DECT transmitter at the headset to DECT transceiver 119 at integrated network device 101. DECT transceiver 119 is coupled to an antenna and may operate at either 1.8 GHz or 900 MHz.

Wireless headset 130 includes a speaker, microphone, and a processor for converting an audio signal received by the speaker into VoIP packets; and a headset transceiver for transmitting and receiving the VoIP packets using the IEEE 802.11 wireless protocol to integrated network device 101. Streaming media applications, such as voice communication require a reliable and predictable data stream. Such reliability and predictability is provided by the ability to classify traffic and prioritize time-sensitive classes of traffic, referred to as QoS (Quality of Service). QoS is addressed by 802.11e. It includes more effective channel management, provides better power management for low power devices, specifies a means to set up side links to other 802.11 devices while simultaneously communicating with an 802.11 AP, and provides improvements to the polling algorithms used by access points.

POTS interface 110 enables integrated network device 101 to make calls and send data (using a modem) over a standard POTS telephone line. Integrated network device 101 may further include a DSL or cable modem port to allow both data and voice transmission over a DSL or cable modem system.

In an embodiment of the invention, wired interface 112 is a USB port. Telephonic device 101 may be connected to a computer for a variety of applications. Integrated network device 101 may include one or more Personal Computer Memory Card International Association (PCMCIA) slots. In an embodiment of the invention, IEEE 802.11 wireless protocol transceiver 122 is a PCMCIA card inserted into integrated network device 101. Integrated network device 101 may include further PCMCIA slots for other wireless interface standard transceivers, such as GPRS or CDMA. Other permutations exist such as including a radio capable of accessing the cellular communications network. This would allow voice and data to be transmitted over a cell network. Utilizing a PCMCIA card radio interface provides a modular solution that allows for use of flexible radio configurations. In a further embodiment, conversion device 106, 122, and 128 are implemented as a USB or peripheral component interconnect (PCI) device.

In an embodiment of the invention, computer 132 is a mobile computing device such as personal digital assistants (PDAs) or notebook computers. Use of a mobile device allows the computer device to moved anywhere within usable range of an 802.11 access point. In an alternative embodiment of the invention, computer 132 is a desktop computer.

Computer 116 may operate software capable of performing additional processing of the packet payload. Utilizing a high quality link such as DECT, the resultant audio quality is sufficient for a computer application running on computer 116, such as voice recognition.

Integrated network device 101 may be utilized as a VoIP telephone that is coupled to wired network 114 via wired interface 112. Integrated network device 101 includes a digital signal processor 135 which convert voice packets from a DECT packet into an Ethernet VoIP packet. Following receipt of a DECT packet by DECT transceiver 119 from headset 120 via DECT link 118, processor 135 strips the packet header to obtain only the packet payload 304. Processor 135 then transcodes the packet payload from 32K bit ADPCM used by DECT to a desired compression required by a VoIP session.

In an embodiment of the invention, the voice data is transcoded to G.729 or G.723, coding scheme standards promulgated by the International Telecommunication Union Telecommunication Standardization Sector (ITU-T). G.729 describes a code excited linear prediction compression (CELP) compression that enables voice to be coded into 8 Kbps stream. Two variations of G.729 exist (G.729 and G.729 Annex A), differing in computational complexity, with both providing speech quality comparable to that of 32 Kbps ADPCM.

G.723 describes a compression technique that is used to compress speech at a low bit rate as part of the H.324 standards family. G.723 is associated with two bit rates: 6.3 Kbps based on multilevel quantization (MP-MLQ) technology and lower quality 5.3 Kbps based on CELP. Other voice coding standards include G.711, G.726, and G.728. Using G.729, a speech sample is generated every 10 ms. The number of speech samples per VoIP packet can be varied. However, because G.729 utilizes 10 ms speech samples, each increase in samples per frame increases the delay by 10 ms. ITU-T G.115 recommends that no more than 150 ms of one way, end-to-end delay should occur in order to maintain good voice quality. The transcoded voice data may be queued into larger packets prior to transmission. A VoIP header is appended to the VoIP packet prior to transmission.

At a listener end, the VoIP packets are received and decoded to reconstruct the desired audio. The packet header is stripped to obtain the voice data packet. The packet payload is trandscoded from the compression used by the VoIP session to 32K bit ADPCM used by DECT.

Integrated network device 101 is a multifunctional device capable of functioning as an 802.11 access point, conventional telephone, VoIP telephone, hardwire Ethernet interface, wireless Ethernet (802.11 interface), and DECT transceiver. Integrated network device 101 thus provides an integrated device for use with converged telephone networks, data networks, and wireless telephone networks, and wireless data networks. Integrated network device 101 provides enhanced audio performance and preserves network bandwidth by offering both DECT and VoIP interfaces. Further, it is more cost efficient in comparison to separate devices.

DECT transceiver 119 is used to communicate with people wearing DECT headsets. By having an 802.11 transceiver 122 in the integrated network device 101, a DECT telephone becomes an 802.11 access point saving system cost since a separate 802.11 access point is not required. By having a separate DECT link to a headset, bandwidth is preserved on the 802.11 network for data in embodiments where only DECT headsets are utilized. DECT transceiver 119 operates on different frequencies, 1.8 GHz in Europe and 900 MHz ISM band in the United States. Because it is on a different frequency, any voice signal will not impact data transmission over the 802.11 network leaving bandwidth to handle data traffic. DECT is very efficient and provides high quality audio. DECT transceiver 119 can support a high number of simultaneous voice transmissions before running out of bandwidth.

As discussed further below in reference to FIG. 2, roaming is easily implemented utilizing each integrated network device 101 as an AP in Mobile IP or DECT roaming. When a headset user gets out of range of one integrated network device, a handoff automatically occurs. A complete VoIP system can be operated from integrated network device 101.

Dialing functions are performed with keypad 102, but dialing may occur remotely either by using voice recognition or by have a separate dialer either attached to the headset or operated out of a small device like a PDA. The PDA dialer may be connected by 802.11 as dialing is an infrequent event and would not impact overall data bandwidth. Because the entire network 100 may be run using VoIP, dialing and call setup and teardown in general can occur over separate devices.

Figure 2:
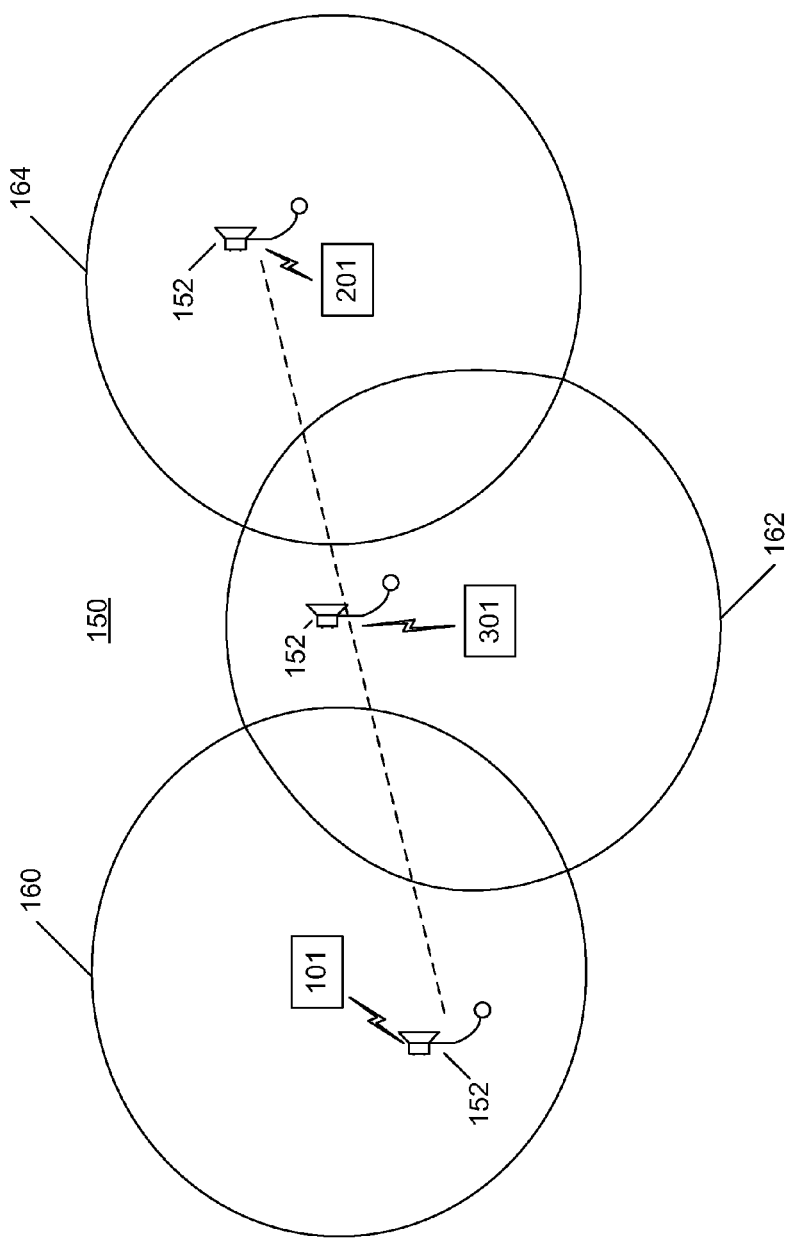
FIG. 2 is an illustration of a roaming headset within a wireless network.

Referring to FIG. 2, an illustration of a roaming headset within a wireless network 150 is shown. Wireless network 150 may be configured to provide communications over a designated geographic area, such as an office space with one or more floors. Wireless network 150 includes a first integrated network device 101, second integrated network device 201, third integrated network device 301, and one or more mobile headsets 152. Use of three integrated network devices is for example purposes only, and the number used may be modified to achieve the desired coverage area. Integrated network device 201 and 301 have components and functionality the same as integrated network device 101.

Integrated network device 101, 201, 301 serve as an AP providing proximate network as one or more mobile headset roam within wireless network 150. Mobile headset 152 includes a DECT transceiver for voice communications and an 802.11 transceiver for data communications. In operation, when mobile headset 152 is located with a coverage area 160, DECT and 802.11 communications are with integrated network device 101. As a user of mobile headset 152 enters coverage area 162, mobile headset 152 DECT and 802.11 communications shift to integrated network device 301 from integrated network device 101. Similarly, as a user of mobile headset 152 enters coverage area 164, DECT and 802.11 communications shift to integrated network device 201 from integrated network device 301.

Mobility and handoffs are performed with Mobile IP while voice communications take place over DECT. Utilizing Mobile IP, mobile headset 152 automatically associates with a new integrated network device as it moves within wireless network 150. Mobile IP in conjunction with DECT establishes the new link prior to dropping the prior link. In this manner, the DECT voice packets continue with the prior link until the second link is established. In an embodiment of the invention, mobile headset 152 also includes a processor for converting an audio signal received by the speaker into VoIP packets for transmission of the audio signal via an IEEE 802.11 interface.

Figure 3:
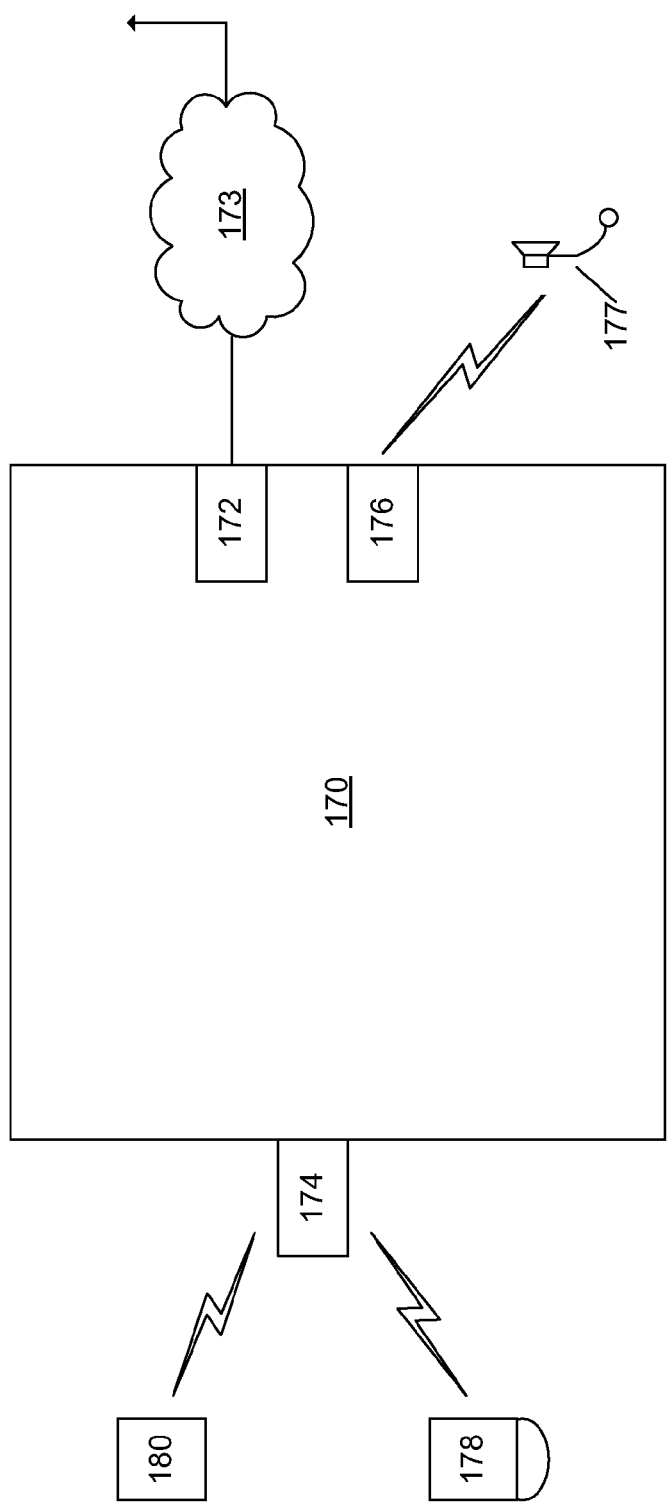
FIG. 3 is a further embodiment of an integrated network device utilizing a separate computer dialpad.

Referring to FIG. 3, an embodiment of wireless network 300 with an integrated network device utilizing a separate computer dialpad is shown. In this embodiment, integrated network device 170 does not contain a dialpad or handset. Integrated network device 170 includes wired interface 172, IEEE 802.11 wireless protocol transceiver 174, and DECT transceiver 176. In a further embodiment, integrated network device 170 may further include a POTS interface coupled to a POTS network. A wireless headset 177 utilizing a DECT transceiver interfaces with DECT transceiver 176 for voice communications. A portable computer 178 is used as a dialpad to receive dialing information. Integrated network device 170 functions as a DECT radio and VoIP interface.

A wireless personal computer 180 with an IEEE 802.11 transceiver may utilize integrated network device 170 as an AP for connecting to WAN network 173 to perform computing functions independent of voice communications. In operation, dialing information is transmitted from portable computer 178 to the integrated network device 170 utilizing IEEE 802.11 transceiver 174. In an embodiment of the invention, portable computer 178 is either a personal digital assistant (PDA) or notebook computer. In a further embodiment of the invention, a desktop PC may be utilized to initiate dialing.

One of ordinary skill in the art will recognize that other data and voice communications protocols may be added to integrated network device 101. Furthermore, similar protocols may be used in alternative of those described herein. For example, other voice communication protocols may be used instead of DECT. Although reference is made throughout the specification to a wireless headset, any wireless hands free device, handset or other telephonic device may be used in place of a wireless headset.

Having described the invention in terms of a preferred embodiment, it will be recognized by those skilled in the art that various types of components may be substituted for the configuration described above to achieve an equivalent result. It will be apparent to those skilled in the art that modifications and variations of the described embodiments are possible, and that other elements or methods may be used to perform equivalent functions, all of which fall within the true spirit and scope of the invention as measured by the following claims.

The invention claimed is:

1. A wireless headset system comprising:
   a headset comprising:
   a speaker;
   a microphone;
   a first transceiver and a second transceiver, wherein the first transceiver utilizes the IEEE 802.11 wireless protocol and the second transceiver utilizes the DECT protocol;
   a wired integrated network device comprising:
   a network interface for connecting to a WAN to receive and transmit data over the WAN; and
   an IEEE 802.11 interface for receiving, transmitting, and processing data using IEEE802.11; and
   a DECT interface for receiving, transmitting, and processing voice communications using DECT, wherein the wired integrated network device is in communication with the headset using both the IEEE 802.11 interface and the DECT interface.

2. The wireless headset system of claim 1, wherein the first transceiver further comprises a processor for converting an audio signal received by the speaker into VoIP packets.

3. A wireless communications network comprising:
   a roaming wireless headset comprising:
   a speaker;
   a microphone;
   a first DECT transceiver; and
   a first IEEE 802.11 transceiver for transmitting and receiving the VoIP packets using the IEEE 802.11 wireless protocol;
   a plurality of wired integrated network devices, each wired integrated network device comprising:
   a network interface for connecting to a WAN to receive and transmit data over the WAN;
   a second DECT transceiver, wherein the DECT transceiver transmits and receives voice communications with the roaming wireless headset; and
   a second IEEE 802.11 transceiver for receiving data from, data processing, and transmitting data to the roaming wireless headset,
   wherein each wired integrated network device serves as an IEEE 802.11 access point with an associated coverage area, and wherein the roaming wireless headset communicates with a selected wired integrated network device depending on the roaming wireless headset location using both DECT and IEEE 802.11.

4. The wireless communications network of claim 3, wherein the wireless headset further comprises a processor for converting an audio signal received by the speaker into VoIP packets.

5. The wireless communications system of claim 3, wherein each wired telephone device further comprises a network interface for receiving and transmitting voice data over a POTS network.

6. The wireless communications system of claim 3, wherein Mobile IP is utilized to determine the selected wired integrated network device.

7. An integrated telephone and data system comprising:
   a wireless headset utilizing a first DECT transceiver;
   a wireless notebook computer or a wireless personal digital assistant for initiating telephone dialing utilizing a first IEEE 802.11 transceiver; and
   a network interface device comprising:
   a network interface for connecting to a WAN to receive and transmit data over the WAN; and
   a second IEEE 802.11 transceiver for receiving telephone dialing information from the wireless notebook computer or wireless personal digital assistant; and
   a second DECT transceiver for transmitting and receiving voice data to and from the wireless headset, wherein the network interface device receives telephone dialing information from the wireless notebook computer or the wireless personal digital assistant using the second IEEE 802.11 transceiver, and receives voice data from the wireless headset using the second DECT transceiver.

8. The telephone system of claim 7, wherein the network interface device further comprises a POTS network interface.

* * * * *